R. B. KILLIN.
Teeth for Thrashing Cylinders.
No. 40,309. Patented Oct. 13, 1863.
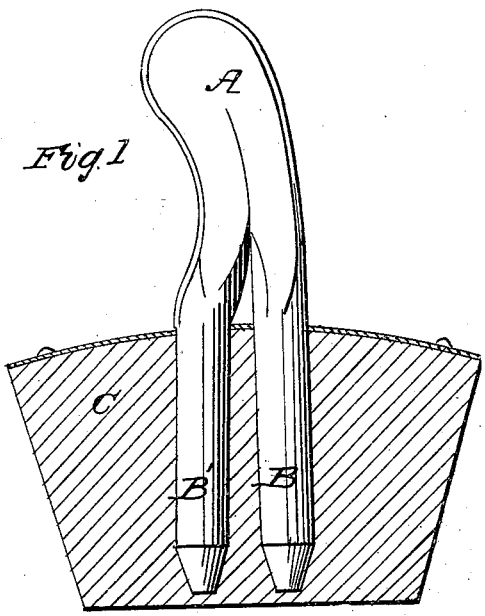
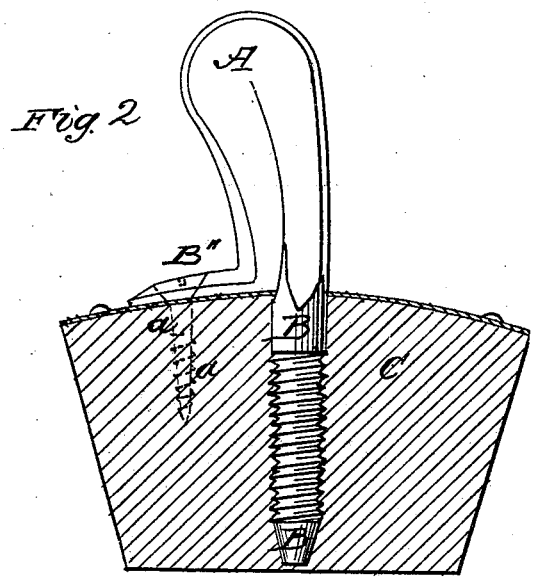
Witnesses
O. E. Wilson
Wm. L. Cutter
Inventor
Robert B. Killin
By atty A. B. Stoughton

UNITED STATES PATENT OFFICE.

R. B. KILLIN, OF CANTON, OHIO, ASSIGNOR TO C. AULTMAN & CO., OF SAME PLACE.

IMPROVEMENT IN TEETH FOR THRASHING-CYLINDERS.

Specification forming part of Letters Patent No. 40,309, dated October 13, 1863.

*To all whom it may concern:*

Be it known that I, ROBERT B. KILLIN, of city of Canton, county of Stark, State of Ohio, have invented certain new and useful Improvements in Teeth for Thrashing-Cylinders; and I do hereby declare the following to be a full, clear, and exact description of the same, reference being had to the accompanying drawings, making a part of this specification, in which—

Figure 1 represents a tooth and the manner of setting it in the cylinder, which has hitherto been regarded as the best form and mode of setting. Fig. 2 represents my improved form of tooth and the manner of fastening it to the cylinder.

In the plan shown in Fig. 1, which has been used extensively, a difficulty arises which is a serious one. All thrashing-cylinder teeth previous to my invention were liable to be broken or to work loose in the cylinder and fly out, either of which accidents was dangerous to the attendant, and often very damaging to the machine; but a greater difficulty was to replace them, for if broken short off there was no ready means to remove the stub or shank from the cylinder, and if removed the hole was so enlarged that another tooth of the same kind or size could not be permanently fastened in it. A single shank with a screw upon it would not alone be reliable, because it would work loose and unscrew itself. Besides, it would lack the brace-support that the tooth shown in Fig. 1 has, and which is important. By my invention I preserve the value and importance of the brace to the tooth, prevent it from turning or unscrewing itself, and can readily remove a broken tooth and replace it by another, should it become necessary to do so.

To enable others skilled in the art to make and use my invention, I will proceed to describe the same with reference to the drawings.

In Fig. 1, A represents a tooth such as are commonly used. It has two shanks, B B', by which it is set in and fastened to the cylinder C by simply driving into the wood of the cylinder, in which the shank B' serves as a brace to the tooth A. By my construction I cut off the shank B' and draw out a portion of it into a foot, B'', through which a wood-screw, $a$, is passed. The shank B has a screw-thread cut on it, by which it is screwed into the wood of the cylinder until the foot B'' comes down against the cylinder, when the screw $a$ is inserted, and the tooth is permanently fastened to the cylinder. It cannot turn around and unscrew itself, because the screw $a$ prevents it from doing so. Should it break short off at the cylinder, a nick may be cut in the stump, and by a screw-driver it can be backed out and a new one put in its place, its hole not being enlarged by the unscrewing.

Having thus fully described my invention, what I claim, and desire to secure by Letters Patent, is—

A tooth for thrashing-cylinders, having a screw-shank, B, and a foot or brace, B'', through which a screw is passed into the wood of the cylinder, the whole being constructed and united to the cylinder in the manner and for the purpose substantially as set forth.

R. B. KILLIN.

Witnesses:
FRED. ORTH,
JOHN TONNER.